United States Patent [19]

Stashko

[11] Patent Number: 4,755,086
[45] Date of Patent: Jul. 5, 1988

[54] CUTTING INSERT

[75] Inventor: Daniel R. Stashko, Holly, Mich.

[73] Assignee: GTE Valenite Corporation, Troy, Mich.

[21] Appl. No.: 112,322

[22] Filed: Oct. 23, 1987

[51] Int. Cl.⁴ .................................... B26D 1/00
[52] U.S. Cl. .................................... 407/114
[58] Field of Search ............ 407/113, 114, 115, 116, 407/117, 1, 1, 104

[56] References Cited

U.S. PATENT DOCUMENTS

| 3,781,956 | 1/1974 | Jones et al. | 29/95 |
| 3,805,349 | 4/1974 | Nose | 29/95 |
| 3,875,663 | 4/1975 | Gustafson et al. | 29/95 |
| 3,882,580 | 5/1975 | Lundgren | 29/95 |
| 4,044,439 | 8/1977 | Romagnolo | 29/95 |
| 4,318,644 | 3/1982 | Seidel | 407/114 |
| 4,318,645 | 3/1982 | McCreery | 407/114 |
| 4,340,324 | 7/1982 | McCreery | 407/114 |
| 4,344,725 | 8/1982 | Seidel | 407/114 |
| 4,507,024 | 3/1985 | Stashko | 407/114 |

OTHER PUBLICATIONS

Seco Insert #CCMX08T308R-79 (DS-102886).

Primary Examiner—Frederick R. Schmidt
Assistant Examiner—Blynn Shideler
Attorney, Agent, or Firm—David J. Koris

[57] ABSTRACT

A disposable cutting insert which presents a positive rake cutting edge to a work piece having surfaces which are angularly oriented to promote smooth cutting action while reducing chatter, vibration, forces and power.

9 Claims, 2 Drawing Sheets

CUTTING INSERT

BACKGROUND OF THE INVENTION

1. Field of the Invention

The present invention relates to a disposable cutting insert, particularly to a cutting insert such as is adapted for being detachably mounted on a tool holder and for cutting a work piece. Cutting inserts of the present invention are generally made of a cemented metal carbide such as tungsten carbide and are formed by pressing techniques after which the pressed articles are sintered.

2. Description of the Prior Art

In the insert of the present invention an indexable insert is provided which presents a positive rake cutting edge to a work piece. Heretofore, the use of such inserts has required cutting forces of such a degree as to cause undesirable tool chatter and vibration. There have been limitations upon the width and depth of cuts made by prior art inserts. The limitations placed upon the axial cut lengths of existing tools have been undesirable. Longer, more desirable tools tend to exhibit greater magnitudes of chatter which eventually results in severe chipping and fracture of the insert. Although such tool damage can be reduced, to do so requires a considerable shortening of the axial length of the tool and providing ample power to attain tool rigidity.

It is highly desirable to provide an indexable insert the use of which significantly reduces tool chatter and vibration. It is likewise desirable to provide such an insert which enables wider and deeper cuts to be taken during the machining operation. It is further desirable to provide an insert which allows for increasing the axial cut length of a tool. It is also desirable to provide an insert which allows attaining facile, chatter free cuts using less power. It is desirable to provide an insert which promotes smoother cutting action while reducing chatter, vibration, forces and power.

SUMMARY OF THE INVENTION

The invention achieves these and other results by providing a cutting insert comprising a polygonal body having substantially parallel upper and lower surfaces including a recessed upper surface and a lower surface having a plurality of lower surface edges. A plurality of peripheral side surfaces is provided each of which extends outwardly and upwardly relative to the lower surface from one of the lower surface edges to one of a plurality of first face surfaces at one of a plurality of first juncture lines. Each of the first face surfaces extends in a plane which is normal to the plane of the lower surface. Each of the peripheral side surfaces extends towards adjacent side surfaces to one of a plurality of corners, each of such corners being formed by a respective corner surface which extends upwardly and outwardly relative to the lower surface from a respective of the lower surface edges to one of a plurality of second face surfaces at one of a plurality of second juncture lines. Each of the peripheral side surfaces and each of the corner surfaces extends at a first angle measured relative to a plane which is normal to the plane of the lower surface. Each second face surface extends inwardly and upwardly relative to the lower surface, at a second angle measured relative to a plane which is parallel to the lower surface, to one of a plurality of third face surfaces at one of a plurality of third juncture lines. Each of the third face surfaces is parallel to the lower surface. A plurality of first inner surfaces is provided each of which extends upwardly and outwardly from the upper surface to meet one of the first face surfaces at one of a plurality of fourth juncture lines. A plurality of second inner surfaces is provided each of which extends upwardly and outwardly from the upper surface to meet one of the third face surfaces at one of a plurality of fifth juncture lines. Each of the first and second inner surfaces extends upwardly and outwardly at a third angle measured relative to a plane which is parallel to the lower surface and each of the first and second inner surfaces meets the upper surface at one of plurality of curved junctures. One end of each of the fifth juncture lines extends at a fourth angle measured relative to an adjacent fourth juncture line, and an opposite end of each of the fifth juncture lines extends at a fifth angle measured relative to an adjacent fourth juncture line.

DESCRIPTION OF THE PREFERRED EMBODIMENT

Figure 1:
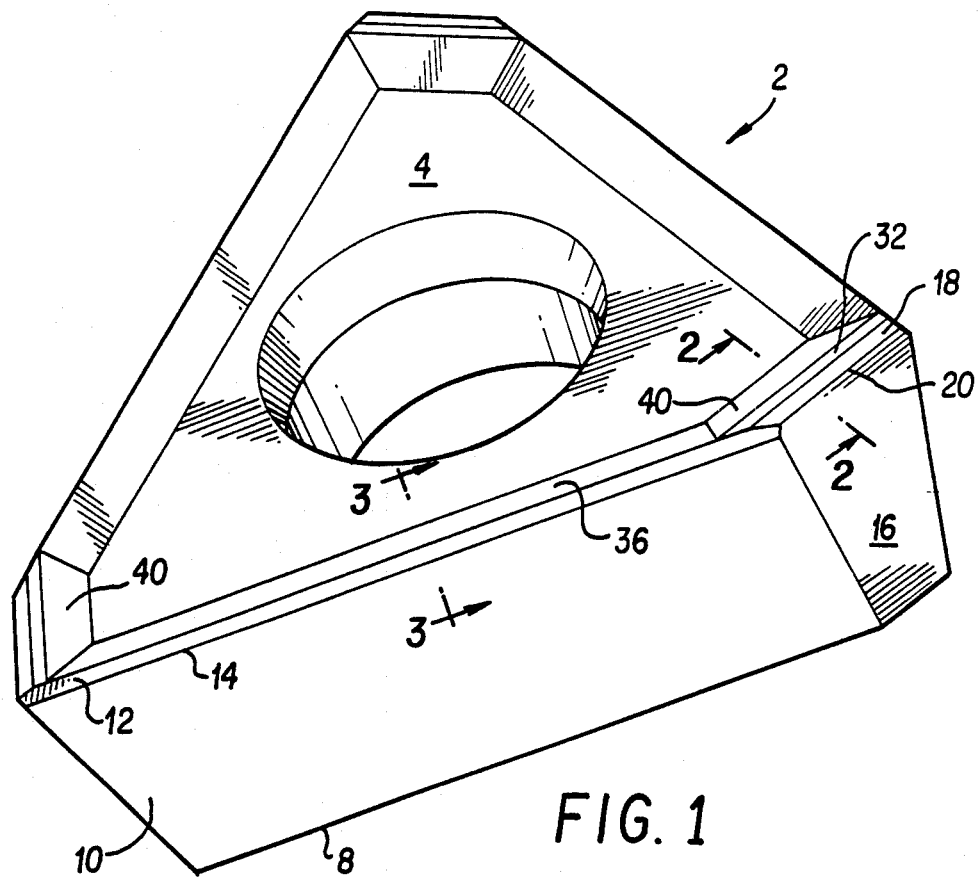
FIG. 1 is a perspective view of one embodiment of the present invention.
Figures 2, 3:
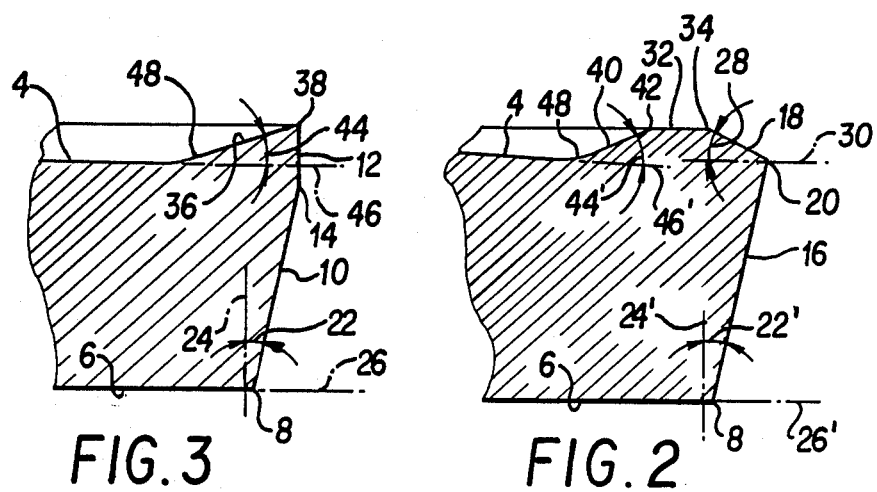
FIG. 2 is a sectional view of FIG. 1 taken along lines 2—2.
FIG. 3 is a sectional view of FIG. 1 taken along lines 3—3.

The embodiment which is illustrated in FIGS. 1 to 4 is particularly suited for achieving the objects of this invention. FIGS. 1 to 4 depict a cutting insert 2 comprising a polygonal body having substantially parallel upper and lower surfaces including a recessed upper surface 4 and a lower surface 6 having a plurality of lower surface edges 8. Although the insert 2 shown in the drawings is triangular in shape, it is contemplated that the insert 2 may be in the shape of any polygon such as a square, diamond or rectangle. As depicted in FIG. 3 the insert includes a plurality of peripheral side surfaces 10 each of which extends outwardly and upwardly relative to the lower surface 6 from one of the lower surface edges 8 to one of a plurality of first face surfaces 12 at one of a plurality of first juncture lines 14. Each of the first face surfaces 12 extends in a plane which is normal to the plane of the lower surface. Each of the peripheral side surfaces 10 extends towards adjacent side surfaces 10 to one of a plurality of corners, each of the corners being formed by a respective corner surface 16. As depicted in FIG. 2, corner surfaces 16 each extend upwardly and outwardly relative the lower surface 6 from a respective of one of the lower surfaces edges 8 to one of a plurality of second face surfaces 18 at one of a plurality of second juncture lines 20. As depicted sectionally in FIGS. 2 and 3, each of the peripheral side surfaces 10 and each of the corner surfaces 16, respectively, extend at a first angle 22, 22' measured relative to a plane 24, 24' which is normal to the plane 26, 26' of the lower surface 6. Although not necessary, in the embodiment of FIGS. 1 to 4, 22, 22' is 11 degrees.

As depicted sectionally in FIG. 2, each second face surface 18 extends inwardly and upwardly relative to the lower surface 6, at a second angle 28 measured relative to a plane 30 which is parallel to the lower surface 6, to one of a plurality of third face surfaces 32 at one of a plurality of third juncture lines 34. Although not necessary, in the embodiment of FIGS. 1 to 4, angle 28 is 15 degrees. Each of the third face surfaces 32 is parallel to the lower surface 6. A plurality of first inner surfaces 36 is provided. As depicted in FIG. 3, each surface 36 extends upwardly and outwardly from the upper surface 4 to meet one of the first face surfaces 12 at one of a plurality of fourth juncture lines 38. Fourth juncture lines 38 form cutting edges by the intersection of each of the first face surfaces 12 with a respective first inner surface 36. As depicted in FIG. 2, a plurality of second inner surfaces 40 is provided. Each surface 40 extends upwardly and outwardly from the upper surface 4 to meet one of the third face surfaces 32 at one of a plurality of fifth juncture lines 42. As depicted sectionally in FIGS. 2 and 3, each of the first inner surfaces 36 and second inner surfaces 40, respectively, extend upwardly and outwardly at a third angle 44, 44' measured relative to a plane 46, 46' which is parallel to the lower surface 6. In such configuration, the slope of each first inner surface 36 imparts a positive rake angle to each respective fourth juncture line 38, fourth juncture lines 38 forming the cutting edges of the tool. Although not necessary, in the embodiment depicted in FIGS. 1 to 4, angle 44, 44' is 15 degrees. In the preferred embodiment, all of the surfaces of insert 2 are planar, and each of the first inner surfaces 36 and second inner surfaces 40 meet the upper surface 4 at one of a plurality of curved junctures 48.

Figure 4:
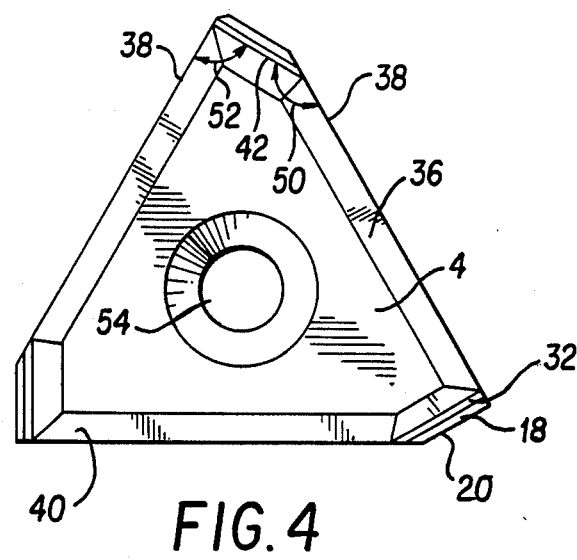
FIG. 4 is a top plan view of the embodiment of FIG. 1.

When the insert 2 is observed from a planar view as illustrated in FIG. 4, one end of each of the fifth juncture lines 42 extends at a fourth angle 50 measured relative to an adjacent fourth juncture line 38, and an opposite end of each of the fifth juncture lines 42 extend at a fifth angle 52 measured relative to an adjacent fourth juncture line 38. Although not necessary, in the embodiment of FIGS. 1 to 4, angle 50 is 120 degrees and angle 52 is 90 degrees.

The insert 2 includes a central opening 54 extending therethrough to facilitate positioning the insert 2 in a tool holder. The opening 54 provides a means whereby a mating member can be fitted within the opening 54 to secure the insert to the work holder. It is also possible to use a center post and washernut combination to hold the insert in place in addition to several other well known securing devices. When the insert 2 of the present invention is positioned in a negative rake holder of the type wherein the insert is tilted downwardly in a known manner, the insert of the present invention provides a positive back rake angle to the work piece along the respective cutting edges 38.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A cutting insert comprising a polygonal body having substantially parallel upper and lower surfaces including a recessed upper surface and a lower surface having a plurality of lower surface edges, a plurality of peripheral side surfaces each of which extends outwardly and upwardly relative to said lower surface from one of said lower surface edges to one of a plurality of first face surfaces at one of a plurality of first juncture lines, each of said first face surfaces extending in a plane which is normal to the plane of said lower surface, each of said peripheral side surfaces extending towards adjacent side surfaces to one of a plurality of corners, each of said corners being formed by a respective corner surface which extends upwardly and outwardly relative to said lower surface from a respective one of said lower surface edges to one of a plurality of second face surfaces at one of a plurality of second juncture lines, each of said peripheral side surfaces and each of said corner surfaces extending at a first angle measured relative to a plane which is normal to the plane of said lower surface, each second face surface extending inwardly and upwardly relative to said lower surface, at a second angle measured relative to a plane which is parallel to said lower surface, to one of a plurality of third face surfaces at one of a plurality of third juncture lines, each of said third face surfaces being parallel to said lower surface, a plurality of first inner surfaces each of which extends upwardly and outwardly from said upper surface to meet one of said first face surfaces at one of a plurality of fourth juncture lines, a plurality of second inner surfaces each of which extends upwardly and outwardly from said upper surface to meet one of said third face surfaces at one of a plurality of fifth juncture lines, each of said first and second inner surfaces extending upwardly and outwardly at a third angle measured relative to a plane which is parallel to said lower surface and each of said first and second inner surfaces meeting said upper surface at one of a plurality of curved junctures, one end of each of said fifth juncture lines extending at a fourth angle measured relative to an adjacent fourth juncture line, and an opposite end of each of said fifth juncture lines extending at a fifth angle measured relative to an adjacent fourth juncture line.

2. The cutting insert of claim 1 wherein said first angle is 11 degrees.

3. The cutting insert of claim 2 wherein said second angle is 15 degrees.

4. The cutting insert of claim 3 wherein said third angle is 15 degrees.

5. The cutting insert of claim 4 wherein said fourth angle is 120 degrees.

6. The cutting insert of claim 5 wherein said fifth angle is 90 degrees.

7. The cutting insert of claim 1 wherein all of said surfaces are planar.

8. The cutting insert of claim 1 wherein said insert comprises tungsten carbide.

9. The cutting insert of claim 1 wherein said insert is triangular in shape.

* * * * *